Nov. 18, 1952

J. G. McKERNAN 2,618,153

CABLE TESTING DEVICE

Filed Dec. 1, 1947

INVENTOR.
John G. McKernan

BY

ATTORNEY.

Patented Nov. 18, 1952

2,618,153

UNITED STATES PATENT OFFICE 2,618,153

CABLE TESTING DEVICE

John G. McKernan, Kansas City, Mo.

Application December 1, 1947, Serial No. 789,070

1 Claim. (Cl. 73—144)

1

This invention relates to production of precision instruments and more particularly to a device for testing the tension of cables, the primary object being to provide a tool of such character capable of determining the relative tension between a plurality of load carrying cables while in use.

The most important object of this invention is the provision of a cable testing device adapted for attachment to a cable or the like while the same is in operative use supporting a load and operable to accurately measure the extent of deflection of a portion of the cable upon manual manipulation of an externally threaded screw.

Another important object of this invention is to provide a cable testing device having a pair of spaced apart hooks and a reciprocable pressure bar slidably disposed for movement against the cable between said hooks to cause deflection of the cable, said device having means for recording the extent of such deflection.

Other objects of this invention include the manner in which a swingable arm is joined to the aforementioned pressure bar to indicate the extent of deflection of the cable being tested; the way in which the extent of deflection is dependent upon the compression of a relatively strong spring; and the way in which the tension of a given cable is accurately recorded upon a card removably held in place upon a frame forming a part of the testing device.

Many minor objects will be made clear or become apparent during the course of the following specification, reference being had to the accompanying drawing, wherein.

Figure 3:
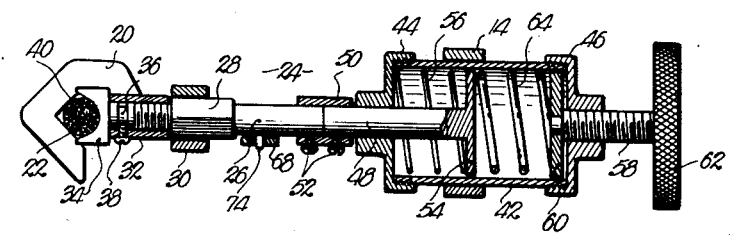
Fig. 3 is a cross sectional view taken on line III—III of Fig. 1.

In the drawing, a frame broadly designated by the numeral 10, includes a pair of spaced apart longitudinal members 12 and 14 joined by a pair of transverse arms 16 and 18 disposed near the ends respectively of the two members 12 and 14. Each of the arms 16 and 18 extend a distance laterally beyond the member 12 and terminate in hooks 20 shaped as clearly illustrated in Fig. 3 of the drawing. These spaced apart hooks 20 are designed to loop over the cable 22 to be tested, this cable 22 being in operative use supporting a load such as an elevator, not shown.

2

A reciprocable pressure bar 24 is disposed substantially midway between the hooks 20 and preferably parallel to each of the arms 16 and 18. This pressure bar 24 is sectional, one section 26 thereof having a portion 28 that is polygonal in cross section to prevent turning as the same slides within a bearing 30 forming a part of the member 12 of frame 10.

A short collar 32 is threaded upon one end of this section 26 of the pressure bar 24 and a head 34 telescoped within the outermost end of this sleeve 32 is mounted for rotation in sleeve 32, there being an annular groove 36 formed in that portion of the head 34 within the sleeve 32 for receiving the innermost end of a set screw 38 threaded in the sleeve 32 and having its innermost end disposed within the groove 36. It is thus seen that the head 34 is not only removably mounted within the sleeve 32 but rotatable therein. This head 34 has a concave edge 40 to conform to the contour of the cable 22 which it engages between the hooks 20 of arms 16 and 18.

A short cylinder 42 mounted upon the member 14 of the frame 10 has a pair of caps 44 and 46 removably covering the ends thereof and a second section 48 of the pressure bar 24 is slidably mounted in the cap 44 of the cylinder 42. This section 48 of the pressure bar 24 is removably secured to the section 26 thereof through the medium of a coupling 50 and a pair of set screws 52. A disc-like plate 54 having a diameter slightly less than the inside diameter of the cylinder 42 is secured to the innermost end of the section 48 of pressure bar 24.

A relatively light coil spring 56 is coiled about the section 48 of pressure bar 24 and interposed between the innermost face of cap 44 and the plate 54 to yieldably maintain the pressure bar 24 at one end of its path of travel away from the cable 22.

A screw 58 threaded into the cap 46 of cylinder 42 has a plate 60 rotatably mounted on the innermost end thereof and a hand grip 62 secured to its normally outermost end. A relatively heavy spring 64 within the cylinder 42 is interposed between the plate 54 of section 48 and the plate 60 on the screw 58.

Figure 2:
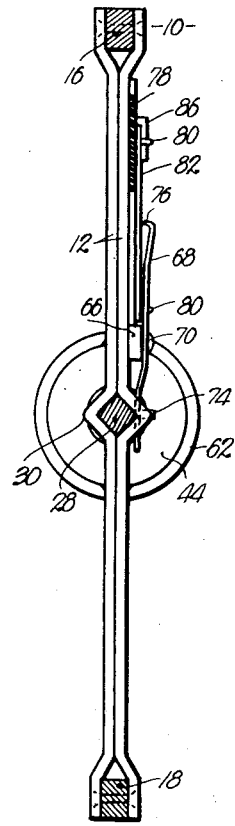
Fig. 2 is a longitudinal cross sectional view taken on line II—II of Fig. 1 and looking in the direction of the arrows.

A bracket 66 extending laterally from the member 12 of frame 10 swingably carries an elongated indicator arm 68, this arm 68 being pivotally mounted upon bracket 66 as at 70 intermediate the ends of arm 68. A longitudinal slot 72 formed in the arm 68 near one end thereof slidably receives a short pin 74 extending from the section 26 of pressure bar 24 between the portion 28 thereof and the coupling 50. As indicated in Fig. 2, this arm 68 has one end thereof opposite to slot 72 turned inwardly into a relatively sharp point 76.

A panel 78 formed from rubber or other impressionable material is suitably mounted upon the frame 10 between the members 12 and 14 thereof adjacent the tip end 76 of the arm 68. A number of short pins 80 extending laterally from the members 12 and 14 respectively of the frame 10 and through the panel 78 receive a card 82 having suitable indicia thereon for recording purposes and a scale 84 disposed along the path of travel of the arm 68. Corner tabs 86 cooperate with the pins 80 in holding the card 82 in place.

Figure 1:
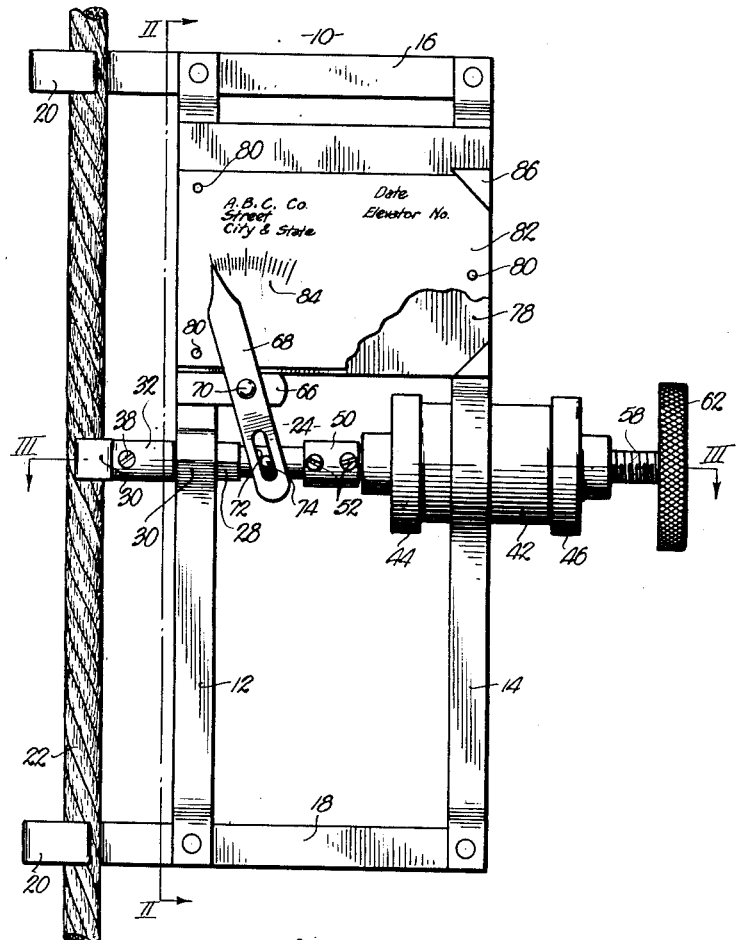
Fig. 1 is a plan view of a cable testing device made in accordance with my present invention, parts being broken away for clearness.

When the testing device above described is placed in use in the manner clearly illustrated in Fig. 1 of the drawing, the hooks 20 thereof are disposed in looped engaging relationship to the cable 22 to be tested and the screw 58 is manually actuated to bring the head 34 of the pressure bar 24 into engagement with the cable 22 on the opposite side to that portion of cable 22 engaged by the hooks 20. As the screw 58 is continued to be manipulated, the cable 22 will be deflected between the hooks 20 and the arm 68 will be swung along the scale 84. After the screw 58 has been moved a predetermined distance into the cap 46 of cylinder 42, the operator merely presses downwardly upon the outermost free end of the arm 68 perforating the card 82 through pressure of the tip end 76 of arm 68 through card 82 and into the panel 78. After such test has been made of a given cable 22, another cable supporting the same load is tested in the same manner using the same card 82. Each time a test is made in this manner of the cables of a given load, the distance of movement of the screw 58 is maintained the same. In other words, the test made is the same for each cable 22 since the distance of travel of the screw 58 remains the same. After all the cables 22 of a given load have been thus tested, it is a simple matter to inspect the card 82 to determine which of the cables is bearing most of the load and it is a simple matter thereafter to adjust such cables in the usual manner and then run the tests again to be assured that each of the cables 22 has precisely the same tension as the remaining cables. Obviously, the extent of deflection of the cable 22 when the test is made as above described, is determined entirely by the spring 64.

It is understood, therefore, that springs 64 of different strengths may be substituted, depending upon the size and tensional strength of the cables 22 to be tested. By the same token, as the diameters of cables 22 tested by the device forming the subject matter of this invention vary, the head 34 may be extended as desired by merely manipulating the collar 32 on the section 26 of the pressure bar 24. The entire assembly may be easily disassembled as desired by simply removing the screws 52 of collar 50 and by removal of the caps 44 and 46 of the cylinder 42. Actual tests have been made using the testing device just described and it has been determined that a plurality of cables bearing the same load, may be adjusted and re-tested until each cable accurately and positively carries its share of the load since the tension of such cables will all be exactly the same. Such tests have also been made upon cables having various types of automatic tension adjusting devices and it has been found that even in such instances the tension of the cables will vary appreciably and can be adjusted through use of this testing device to the minutest detail.

Manifestly many changes and modifications may be made particularly with respect to details of construction without departing from the spirit of this invention as defined by the appended claim.

Having thus described my invention, what I claim as new and desire to be secured by Letters Patent is:

A cable testing device of the kind set forth comprising a frame; a record card on the frame; a pair of spaced-apart, cable-engaging hooks extending laterally from said frame; a pressure bar slidably and non-rotatably mounted on said frame between said hooks; means for moving one end of said bar against the cable, whereby to clamp the latter against said hooks; a spring interposed between the opposite end of the bar and said moving means; and structure operably connected with said bar for indicating the extent of movement of the bar in response to deflection of the cable when pressure is applied thereto by said bar, said structure including a resilient, swingable arm operably joined to said pressure bar, said arm being pivotally secured intermediate its ends to said frame, and having an elongated slot formed in one end thereof, said pressure bar being provided with a pin slidably mounted in said slot, and a card-piercing element on the opposite end of the arm.

JOHN G. McKERNAN.

REFERENCES CITED

The following references are of record in the file of this patent:

UNITED STATES PATENTS

| Number | Name | Date |
|---|---|---|
| 1,380,251 | Riba | May 31, 1921 |
| 1,833,195 | Albright | Nov. 24, 1931 |
| 1,987,815 | Bartol | Jan. 15, 1935 |
| 2,257,483 | Roche | Sept. 30, 1941 |

FOREIGN PATENTS

| Number | Country | Date |
|---|---|---|
| 801,604 | France | May 23, 1936 |